(12) United States Patent
Iwanaga et al.

(10) Patent No.: US 8,633,636 B2
(45) Date of Patent: Jan. 21, 2014

(54) LAMINATED CERAMIC ELECTRONIC COMPONENT AND MANUFACTURING METHOD THEREOF

(75) Inventors: Toshiyuki Iwanaga, Nagaokakyo (JP); Makoto Ogawa, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 363 days.

(21) Appl. No.: 13/189,636

(22) Filed: Jul. 25, 2011

(65) Prior Publication Data

US 2012/0019100 A1    Jan. 26, 2012

(30) Foreign Application Priority Data

Jul. 26, 2010   (JP) .................................. 2010-166670

(51) Int. Cl.
*H01L 21/20* (2006.01)
*H01L 41/047* (2006.01)
*H01L 41/083* (2006.01)

(52) U.S. Cl.
USPC ........... 310/366; 310/328; 310/340; 438/396; 29/25.35

(58) Field of Classification Search
USPC ........................ 310/328, 340, 366; 438/396
See application file for complete search history.

(56) References Cited

U.S. PATENT DOCUMENTS

| | | | |
|---|---|---|---|
| 6,785,941 B2 * | 9/2004 | Nakamura | 29/25.42 |
| 6,960,366 B2 | 11/2005 | Ritter et al. | |
| 6,972,942 B2 | 12/2005 | Ritter et al. | |
| 6,982,863 B2 | 1/2006 | Galvagni et al. | |
| 7,067,172 B2 | 6/2006 | Ritter et al. | |
| 7,152,291 B2 | 12/2006 | Ritter et al. | |

(Continued)

FOREIGN PATENT DOCUMENTS

| JP | 2004-040084 | * | 2/2004 | ............. H01G 4/252 |
|---|---|---|---|---|
| JP | 2004-040084 A | | 2/2004 | |

(Continued)

OTHER PUBLICATIONS

Taniguchi et al.; "Multilayer Ceramic Electronic Component and Manufacturing Method Thereof"; U.S. Appl. No. 12/485,360; filed Jun. 16, 2009.

(Continued)

*Primary Examiner* — Thomas Dougherty
(74) *Attorney, Agent, or Firm* — Keating & Bennett, LLP

(57) ABSTRACT

In a method for manufacturing a laminated ceramic electronic component, when a plating film to define an external terminal electrode is formed by plating exposed ends of a plurality of internal electrodes at a WT surface of a component main body, ingress of a plating solution may be caused from a gap between an end edge of the plating film and the component main body to decrease the reliability of a laminated electronic component obtained. An internal dummy electrode is provided around a region where the exposed ends of the plurality of internal electrodes are distributed in the WT surface of the component main body. The internal dummy electrode includes two LW-direction sections extending parallel or substantially parallel to each other in a direction along the LW surface, and two LT-direction sections extending parallel or substantially parallel to each other in a direction along the LT surface. The plating film is formed at least over the exposed end of the internal dummy electrode. The internal dummy electrode is formed by wrapping an outer layer sheet with the internal dummy electrode formed around a laminate composed of ceramic layers and the internal electrodes.

12 Claims, 8 Drawing Sheets

(56) References Cited

U.S. PATENT DOCUMENTS

| | | |
|---|---|---|
| 7,154,374 B2 | 12/2006 | Ritter et al. |
| 7,161,794 B2 | 1/2007 | Galvagni et al. |
| 7,177,137 B2 | 2/2007 | Ritter et al. |
| 7,344,981 B2 | 3/2008 | Ritter et al. |
| 7,345,868 B2 | 3/2008 | Trinh |
| 7,463,474 B2 | 12/2008 | Ritter et al. |
| 2004/0042156 A1* | 3/2004 | Devoe et al. ............... 361/321.2 |
| 2005/0046536 A1 | 3/2005 | Ritter et al. |
| 2006/0187612 A1* | 8/2006 | Yamane et al. ............... 361/303 |
| 2007/0014075 A1 | 1/2007 | Ritter et al. |
| 2007/0201183 A1* | 8/2007 | Komatsu et al. ............. 361/311 |
| 2008/0123248 A1 | 5/2008 | Kunishi et al. |
| 2008/0123249 A1 | 5/2008 | Kunishi et al. |
| 2008/0158774 A1 | 7/2008 | Trinh |
| 2009/0000092 A1* | 1/2009 | Sugg ............................ 29/25.35 |
| 2009/0225462 A1* | 9/2009 | Ojima ............................ 360/31 |
| 2009/0226705 A1* | 9/2009 | Motoki et al. ................ 428/323 |
| 2010/0092740 A1* | 4/2010 | Motoki et al. ................ 428/209 |
| 2010/0220426 A1* | 9/2010 | Shimizu ..................... 361/306.3 |

FOREIGN PATENT DOCUMENTS

| | | | | |
|---|---|---|---|---|
| JP | 2004-146401 | * | 5/2004 | ............... H01G 4/30 |
| JP | 2004-146401 A | | 5/2004 | |
| JP | 2008-041786 A | | 2/2008 | |

OTHER PUBLICATIONS

Yoshida et al.; "Monolithic Ceramic Electronic Component"; U.S. Appl. No. 12/494,537; filed Jun. 30, 2009.

Sasaki; "Electronic Component"; U.S. Appl. No. 13/187,678; filed Jul. 21, 2011.

* cited by examiner

LAMINATED CERAMIC ELECTRONIC COMPONENT AND MANUFACTURING METHOD THEREOF

BACKGROUND OF THE INVENTION

1. Field of the Invention

The present invention relates to a laminated ceramic electronic component and a method for manufacturing the laminated ceramic electronic component, and more particularly, to a laminated ceramic electronic component, for example, including a conductor film that defines an external terminal electrode, which is directly formed by plating so as to be electrically connected to a plurality of internal conductors, and a method for manufacturing the laminated ceramic electronic component.

2. Description of the Related Art

As shown in FIG. 7, a laminated ceramic electronic component 101 typified by a laminated ceramic capacitor typically includes a component main body 105 which has a stack structure including a plurality of stacked ceramic layers 102 composed of, for example, a dielectric ceramic, and a plurality of internal electrodes 103 and 104 formed along the interfaces between the ceramic layers 102. The plurality of internal electrodes 103 and the plurality of internal electrodes 104 each have ends respectively exposed at two opposite end surfaces 106 and 107 of the component main body 105, and external terminal electrodes 108 and 109 are formed respectively so as to electrically connect the respective exposed ends of the internal electrodes 103 to each other and electrically connect the respective exposed ends of the internal electrodes 104 to each other.

For the formation of the external terminal electrodes 108 and 109, typically, a metal paste containing a metal constituent and a glass constituent is applied onto the end surfaces 106 and 107 of the component main body 105, and then subjected to firing, thereby forming paste electrode layers 110 first. Next, a first plating layer 111 containing, for example, nickel as its main constituent is formed on the paste electrode layers 110, and a second plating layer 112 containing, for example, tin or gold as its main constituent is further formed thereon. More specifically, the external terminal electrodes 108 and 109 are each composed of a three-layer structure of the paste electrode layer 110, the first plating layer 111, and the second plating layer 112.

The external terminal electrodes 108 and 109 are required to provide favorable solderability when the laminated ceramic electronic component 101 is mounted onto a substrate with the use of solder. At the same time, the external terminal electrode 108 is required to serve to electrically connect the plurality of internal electrodes 103 to each other, which are electrically insulated from each other, and the external terminal electrode 109 is required to serve to electrically connect the plurality of internal electrodes 104 to each other, which are electrically insulated from each other. The second plating layer 112 described above serves to ensure solderability, whereas the paste electrode layer 110 serves to electrically connect the internal electrodes 103 to each other and the internal electrodes 104 to each other. The first plating layer 111 serves to prevent solder erosion in solder joint.

However, the paste electrode layer 110 has a large thickness of several tens μm to several hundreds μm. Therefore, in order to limit the dimensions of the laminated ceramic electronic component 101 up to certain specifications, there is undesirably a need to reduce the effective volume for ensuring a capacitance, because there is a need to ensure the volume for the paste electrode layers 110.

On the other hand, the plating layers 111 and 112 each have a thickness on the order of several μm. Thus, if the external terminal electrodes 108 and 109 can be composed of only plating films such as the first plating layer 111 and the second plating layer 112, the effective volume can be ensured more for ensuring the capacitance, and the effective volume fraction can be thus improved. However, when plating is applied directly onto the end surfaces 106 and 107 of the component main body 105, the following problems may be encountered.

First, as shown in FIG. 8, a component main body 122 of a laminated ceramic electronic component is supposed to have a rectangular parallelepiped shape including an LW surface 123 defined by a length dimension L and a width dimension W, an LT surface 124 defined by the length dimension L and a thickness dimension T, and a WT surface 125 defined by the width dimension W and the thickness dimension T, and have a plurality of ceramic layers 126 extending in the direction of the LW surface 123, which are stacked in the thickness direction. It is to be noted that the end surfaces 106 and 107 of the component main body 105 shown in FIG. 7 correspond to the WT surface 125.

To take a laminated ceramic capacitor as an example of the laminated ceramic electronic component, the laminated ceramic capacitor includes, as in the case of sections indicated by a dashed line in FIG. 8, outer layer sections 129 extending along the LW surface 123 and width-direction gap sections 130 along extending the LT surface 124 as protective sections, outside an effective section 128 which has a plurality of internal electrodes 127 distributed therein and forms a capacitance.

When a plating film is to be formed on the WT surface 125, it is only for the region corresponding to the effective section 128 that a sufficient coverage with the plating film can be achieved while controlling plating deposition appropriately. Therefore, the ingress of moisture, etc., is highly likely to be caused along the interface between the plating film and the component main body 122 from an end edge of the plating film, and in addition, the fixing strength of the plating film tends to be decreased. On the other hand, in the case of setting up such a condition that can increase the degree of growth of the plating film, it is difficult to control the degree of the plating growth, and there will be thus great variability caused in the film formation region.

It is to be noted that if the region on which a plating film is to be formed is subjected to a pretreatment such as a catalytic treatment, the problems as described above can be solved to some extent. However, the pretreatment such as a catalytic treatment to only a specific point is complicated, which is not preferable.

Therefore, for example, the technique disclosed in Japanese Patent Application Laid-Open No. 2004-146401 or Japanese Patent Application Laid-Open No. 2004-40084 has been attracting attention.

Japanese Patent Application Laid-Open No. 2004-146401 discloses a method in which a conductive paste or a conductive resin is applied onto at least ridge sections of end surfaces of a component main body along the direction of stacking internal electrodes so as to come into contact with leading sections of the internal electrodes, and the conductive paste is subjected to firing or the conductive resin is thermally cured to form a conductive film, and further, the end surfaces of the component main body are subjected to electroplating, thereby forming an electroplating film so as to be connected to the conductive film on the ridge sections described above. This method ensures that a plating film can be formed so as to reach and cover the conductive film on the ridge sections.

On the other hand, Japanese Patent Application Laid-Open No. 2004-40084 discloses, in particular, in FIG. 8B, etc. thereof, an internal anchor tab formed as a dummy internal electrode in an outer layer section, and a plating film formed so as to reach at least an exposed end of the internal anchor tab.

However, in the method described in Japanese Patent Application Laid-Open No. 2004-146401, when the conductive films formed on the ridge sections of the end surfaces of the component main body are formed by firing of the conductive paste, the glass contained in the conductive paste then makes it more likely to be dissolved in a plating solution, thereby permitting the ingress of moisture to be caused. On the other hand, in the case of using the conductive resin, the conductive resin has the drawback of weakness to the heat treatment, and seems to have poor fixing strength.

Next, the technique described in Japanese Patent Application Laid-Open No. 2004-40084 allows the plating film to extend even to the outer layer section, with the use of the WT-surface exposed end of the internal anchor tab placed in the outer layer section as a nucleus for plating deposition, but fails to allow the plating film to extend onto the width-direction gap section, thus permitting the ingress of moisture to be caused therefrom.

SUMMARY OF THE INVENTION

Preferred embodiments of the present invention provide a laminated ceramic electronic component solves the problems as described above, and a method for manufacturing the laminated ceramic electronic component.

According to a preferred embodiment of the present invention, a laminated ceramic electronic component includes a component main body having a rectangular parallelepiped shape or a substantially rectangular parallelepiped shape including an LW surface defined by a length dimension L and a width dimension W, an LT surface defined by the length dimension L and a thickness dimension T, and a WT surface defined by the width dimension W and the thickness dimension T, the component main body having a stack structure including a plurality of ceramic layers extending in the direction of the LW surface and stacked in the thickness direction and a plurality of internal electrodes arranged along interfaces between the ceramic layers and including exposed ends exposed at the WT surface; and a plating film provided on at least the WT surface so as to electrically connect the respective exposed ends of the plurality of internal electrodes to each other, and preferably includes one or more of the following aspects, features or characteristics in order to solve the technical problems described above.

The component main body preferably further includes an internal dummy electrode with an exposed end exposed around a region where the exposed ends of the plurality of internal electrodes are distributed in the WT surface. This internal dummy electrode includes two LW-direction sections extending parallel or substantially parallel to each other in a direction along the LW surface, and two LT-direction sections extending parallel or substantially parallel to each other in a direction along the LT surface. Furthermore, the plating film is preferably arranged to extend at least over the exposed end of the internal dummy electrode.

In the laminated ceramic electronic component according to a preferred embodiment of the present invention, at least one of the LW-direction sections of and at least one of the LT-direction sections of the internal dummy electrode are preferably connected to each other.

In addition, the laminated ceramic electronic component according to a preferred embodiment of the present invention preferably further includes an external dummy electrode provided in a region in the LW surface and the LT surface, which is adjacent to the WT surface. In this case, the plating film is preferably arranged so as to cover the WT surface and cover at least the external dummy electrode.

According to another preferred embodiment of the present invention, a method for manufacturing a laminated ceramic electronic component includes the steps of preparing a component main body having a rectangular parallelepiped shape or a substantially rectangular parallelepiped shape including an LW surface defined by a length dimension L and a width dimension W, an LT surface defined by the length dimension L and a thickness dimension T, and a WT surface defined by the width dimension W and the thickness dimension T, the component main body having a stack structure including a plurality of ceramic layers extending in the direction of the LW surface and stacked in the thickness direction and a plurality of internal electrodes formed along interfaces between the ceramic layers and having exposed ends exposed at the WT surface; and forming a plating film on at least the WT surface so as to electrically connect the respective exposed ends of the plurality of internal electrodes to each other. Furthermore, the method includes one or more of the following aspects, features or characteristics in order to solve the technical problems described above.

The step of preparing the component main body preferably includes a step of preparing a raw laminate having a stack structure including the plurality of ceramic layers and the plurality of internal electrodes in the raw; a step of forming an internal dummy electrode extending along surfaces of the raw laminate that are respectively parallel or substantially parallel to the LW surface and the LT surface, and the internal dummy electrode including an exposed end that is exposed at the WT surface, and forming a raw ceramic outer layer covering the internal dummy electrode; and a step of firing the raw laminate including the internal dummy electrode and the raw ceramic outer layer. Furthermore, the step of forming the plating film preferably includes a step of forming the plating film so as to reach at least the exposed end of the internal dummy electrode.

In the method for manufacturing a laminated ceramic electronic component according to a preferred embodiment of the present invention, it is preferable to prepare an outer layer sheet in advance including an integrated combination of the internal dummy electrode and the raw ceramic outer layer and attach the outer layer sheet onto the surfaces of the raw laminate that are respectively parallel or substantially parallel to the LW surface and the LT surface, in order to form the internal dummy electrode and the raw ceramic outer layer.

In the preferred embodiment described above, more specifically, in a first example, multiple outer layer sheets are prepared, and attached side by side onto the surfaces of the raw laminate that are respectively parallel or substantially parallel to the LW surface and the LT surface. In a second example, a length of an outer layer sheet is prepared, which forms a circuit along the surfaces of the raw laminate that are respectively parallel or substantially parallel to the LW surface and the LT surface, and wrapped so as to form a circuit along the surfaces of the raw laminate that are respectively parallel or substantially parallel to the LW surface and the LT surface.

The outer layer sheet described above preferably further includes an external dummy electrode formed on the raw ceramic outer layer. This external dummy electrode is located in a region in the LW surface and the LT surface, the region adjacent to the WT surface. Furthermore, in the step of forming the plating film, the plating film is formed preferably so as to cover at least the external dummy electrode.

In addition, the outer layer sheet described above preferably has a stack structure further including a raw ceramic base layer integrally combined in advance in addition to the internal dummy electrode and the raw ceramic outer layer, the internal dummy electrode sandwiched between the raw ceramic base layer and the raw ceramic outer layer.

The external dummy electrode may be formed on the raw ceramic outer layer by a method such as coating so as to be located in a region in the LW surface and the LT surface, the region adjacent to the WT surface, rather than being formed on the outer layer sheet described above. Also in this case, in the step of forming the plating film, the plating film is formed preferably so as to cover at least the external dummy electrode.

Alternatively, a raw ceramic base layer may be formed by a method such as coating on the surfaces of the raw laminate that are respectively parallel or substantially parallel to the LW surface and the LT surface, rather than using the outer layer sheet with a ceramic base layer provided as described above.

When the raw ceramic base layer is formed, the raw laminate prepared in the step of preparing the raw laminate may have the internal electrodes exposed at the surface of the raw laminate that is parallel or substantially parallel to the LT surface.

According to various preferred embodiments of the present invention, the component main body includes the internal dummy electrode which extends along each of the LW surface and the LT surface and includes the exposed end exposed at the WT surface. Thus, the plating film is formed at least over the exposed end of the internal dummy electrode while electrically connecting the respective exposed ends of the plurality of internal electrodes to each other at the WT surface. Therefore, the plating film can be formed which has a high fixing strength with the component main body, the ingress of moisture into the interface between the plating film and the component main body as well as into the component main body is prevented, and the reliability of the laminated ceramic electronic component is therefore improved.

In particular, the exposed end of the LT-direction section of the internal dummy electrode, which extends in a direction perpendicular or substantially perpendicular to the exposed ends of the internal electrodes, cannot be achieved in any way by the internal anchor tab described above in Japanese Patent Application Laid-Open No. 2004-40084. Thus, it is to be understood that the advantageous effects of prevention of moisture ingress produced by the exposed end of the LT-direction section is one unique feature achieved by various preferred embodiments of the present invention.

When at least one of the LW-direction sections of and at least one of the LT-direction sections of the internal dummy electrode are connected to each other, discontinuity of the exposed end of the internal dummy electrode is further reduced, and the gap permitting the ingress of moisture can be thus further reduced.

The further provided external dummy electrode makes it easy to form the plating film controlled from the WT surface of the component main body to portions for each of the LW surface and LT surface adjacent to the WT surface, and allows the dimensional accuracy of the plating film on the LW surface and on the LT surface to be increased.

In the manufacturing method according to various preferred embodiments of the present invention, when the outer layer sheet is used which is obtained in advance by an integrated combination of the internal dummy electrode and the raw ceramic outer layer, preferably, even further including the raw ceramic base layer integrally combined in advance, the internal dummy electrode can be formed efficiently. In addition, since the formation of the internal dummy electrode is carried out in the stage of the outer layer sheet, the internal dummy electrode can be adjusted easily and freely in terms of position, size, shape, and number. Furthermore, the outer layer sheet can also have the external dummy electrode formed, and the formation of the external dummy electrode can be thus carried out easily and efficiently.

In the case of using the outer layer sheet as described above, as a first example, when multiple outer layer sheets are prepared, and attached side by side onto the surfaces of the raw laminate that are respectively parallel or substantially parallel to the LW surface and the LT surface, the outer layer sheet on the surface that is parallel or substantially parallel to the LW surface can be designed in a different form from the outer layer sheet on the surface parallel or substantially parallel to the LT surface. For example, the number of internal dummy electrodes stacked and the area of the internal dummy electrode and/or the external dummy electrode can be varied between the outer layer sheet on the surface that is parallel or substantially parallel to the LW surface and the outer layer sheet on the surface that is parallel or substantially parallel to the LT surface.

On the other hand, as a second example of the use of the outer layer sheet as described above, when a length of an outer layer sheet, which forms a circuit along the surfaces of the raw laminate that are respectively parallel or substantially parallel to the LW surface and the LT surface, is prepared, and wrapped so as to form a circuit along the surfaces of the raw laminate that are respectively parallel or substantially parallel to the LW surface and the LT surface, the outer layer sheet can be placed efficiently on the raw laminate. In addition, the outer layer sheet wrapped in a creative way allows the exposed end of the internal dummy electrode to form a circuit continuously around the raw laminate. Thus, the ingress of moisture is prevented with more certainty.

In the case of the raw ceramic base layer formed between the internal dummy electrode and the raw laminate, the raw laminate may have the internal electrodes exposed at the surface of the raw laminate that is parallel or substantially parallel to the LT surface. Thus, the effective volume fraction can be improved in the raw laminate.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

The structure of a laminated ceramic electronic component 1 according to a preferred embodiment of the present invention will be described with reference to FIGS. 1 and 5.

Figure 1:
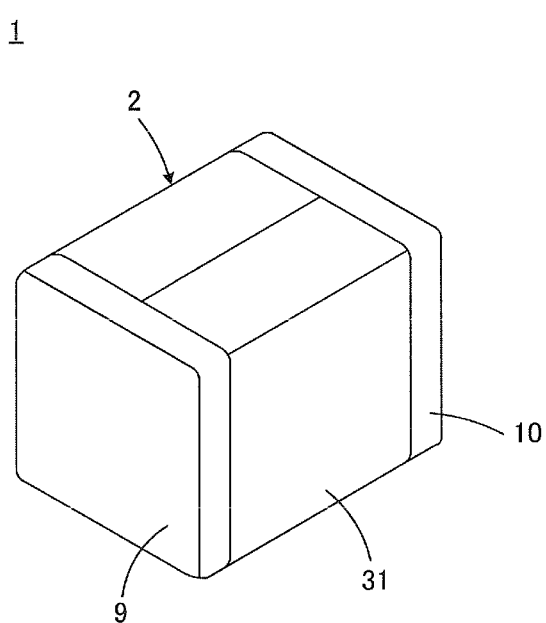
FIG. 1 is a perspective view illustrating the appearance of a laminated ceramic electronic component 1 according to a first preferred embodiment of the present invention.
Figure 5:
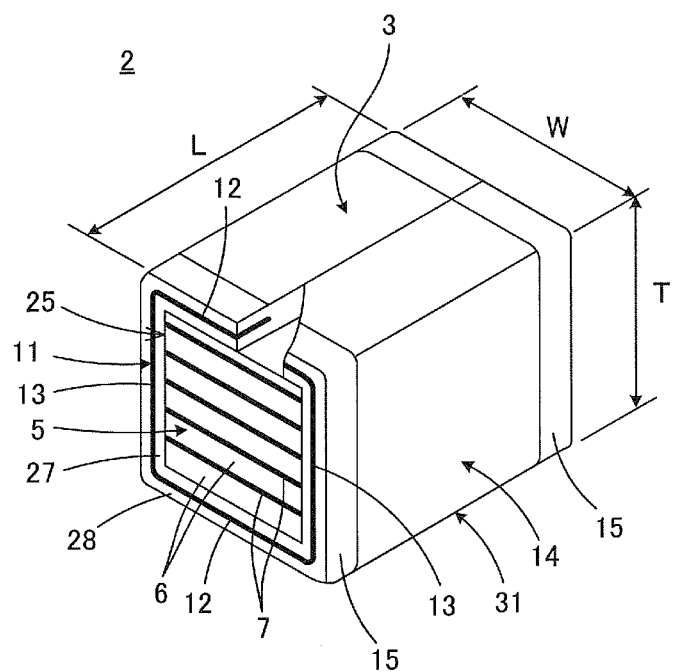
FIG. 5 is a perspective view illustrating the appearance of a component main body 2 obtained by wrapping an outer layer sheet 31 extracted from the mother sheet 26 for an outer layer shown in FIG. 4 around the raw laminate 25 shown in FIG. 3, and then carrying out firing, and partially illustrating the junction surface of the outer layer 31.

The laminated ceramic electronic component 1 shown in FIG. 1 includes a component main body 2 shown in FIG. 5. The component main body 2 preferably has, for example, a rectangular parallelepiped shape or a substantially rectangular parallelepiped shape including an LW surface 3 defined by a length dimension L and a width dimension W, an LT surface 4 defined by the length dimension L and a thickness dimension T, and a WT surface 5 defined by the width dimension W and the thickness dimension T.

Figure 3:
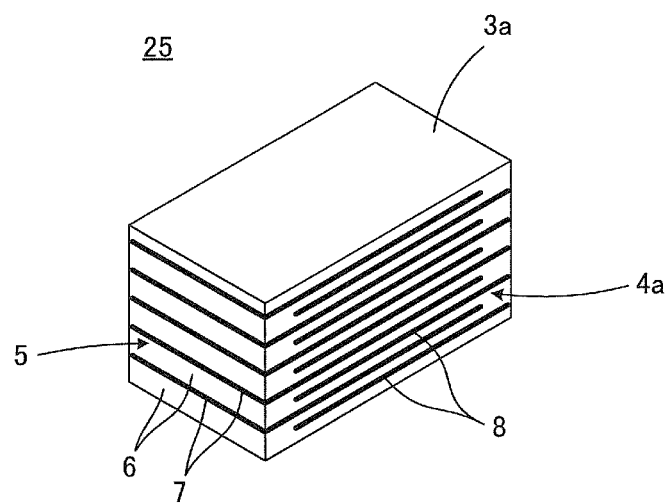
FIG. 3 is a perspective view illustrating the appearance of a raw laminate 25 obtained through the step of stacking the ceramic green sheets 21 and 22 shown in FIG. 2.

In addition, the component main body 2 preferably has a stack structure including a plurality of ceramic layers 6 which extend in the direction of the LW surface 3 and are stacked in the thickness direction, and of a plurality of internal electrodes 7 and 8 which are arranged to extend along the interfaces between the ceramic layers 6 and include exposed ends exposed at the WT surface 5. The internal electrodes 8 are shown in FIG. 3. As can be seen from FIG. 3, the internal electrodes 7 and the internal electrodes 8 are arranged alternately in the thickness direction of the component main body 2.

The laminated ceramic electronic component 1 also includes plating films 9 and 10 provided at least on the WT surfaces 5. The plating films 9 and 10 define external terminal electrodes for the laminated ceramic electronic component 1. As can be seen from reference to both FIG. 1 and FIG. 3, the plating film 9 electrically connects the respective exposed ends of the plurality of internal electrodes 7 to each other, whereas the plating film 10 electrically connects the respective exposed ends of the plurality of internal electrodes 8 to each other.

The component main body 2 further includes an internal dummy electrode 11. The internal dummy electrode 11 has an exposed end at the WT surface 5. The exposed end of the internal dummy electrode 11 is located around the region where the exposed ends of the plurality of internal electrodes 7 are distributed in the WT surface 5. The internal dummy electrode 11 preferably includes two LW-direction sections 12 extending parallel or substantially parallel to each other in a direction along the LW surface 3, and two LT-direction sections 13 extending parallel or substantially parallel to each other in a direction along the LT surface 4. In this preferred embodiment, the exposed end of the internal dummy electrode 11 defines a circuit in the component main body 2 continuously. Furthermore, the plating film 9 is arranged to extend preferably at least over the exposed end of the internal dummy electrode 11.

In particular, in this preferred embodiment, the component main body 2 further includes external dummy electrodes 15 provided in a region adjacent to the WT surfaces 5 in the LW surface 3 and the LT surface 4. Therefore, the plating film 9 is preferably arranged to cover the WT surface 5 and also cover at least the external dummy electrode 15.

This type of a laminated ceramic electronic component 1 is produced, for example, in the following way.

First, the component main body 2 is prepared as shown in FIG. 5. More specifically, the following steps are carried out in order to prepare the component main body 2.

Figure 2A:
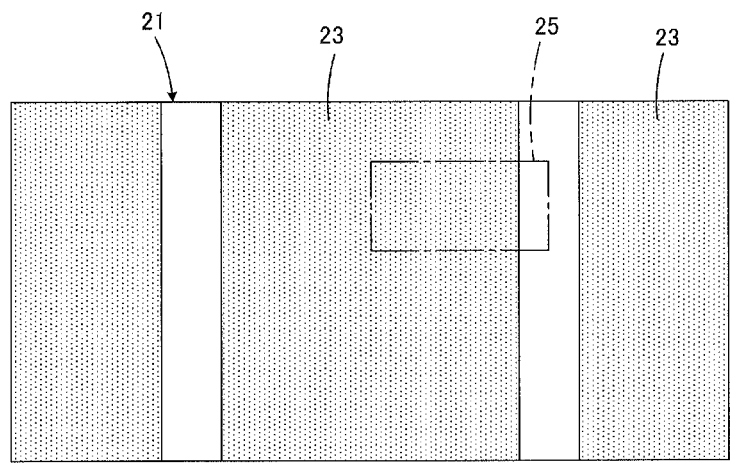
FIGS. 2A and 2B are plan views illustrating ceramic green sheets 21 and 22 respectively with conductive paste films 23 and 24 formed to define internal electrodes 7 and 8, which are stacked to prepare a raw laminate 25, for the explanation of a method for manufacturing the laminated ceramic electronic component 1 shown in FIG. 1.
Figure 2B:
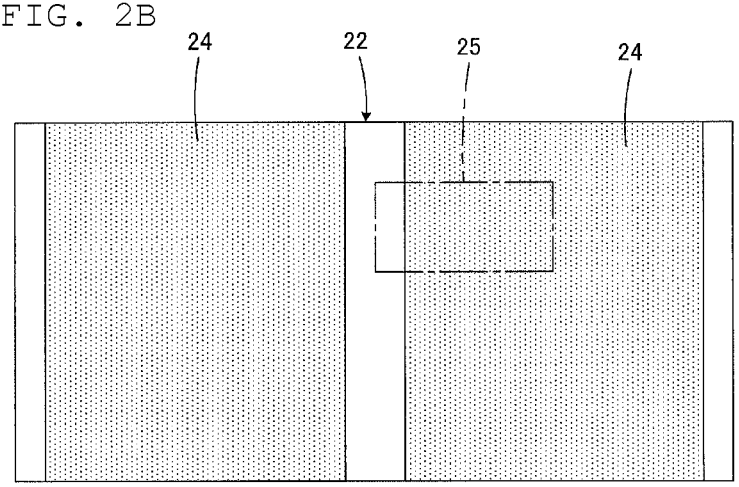

Ceramic green sheets 21 and 22 are prepared respectively as shown in FIGS. 2A and 2B. On the ceramic green sheets 21 and 22, conductive paste films 23 and 24 to define the internal electrodes 7 and 8 are formed into strips by printing, respectively.

It is to be noted that the ceramic green sheets 21 and 22 are each shown only partially in FIGS. 2A and 2B, but illustrate in enough detail to enable understanding of the forms of the respective typical regions.

Next, the plurality of ceramic green sheets 21 as shown in FIG. 2A and the plurality of ceramic green sheets 22 as shown in FIG. 2B are stacked alternately and subjected to pressure bonding, and then cut into a predetermined size. Thus, a raw laminate 25 is obtained as shown in FIG. 3. In FIGS. 2A and 2B, the region corresponding to the raw laminate 25 shown in FIG. 3 is indicated by an alternate long and short dash line. As can be seen from the size and location of the region indicated by the alternate long and short dash line, a plurality of raw laminates 25 can be extracted from the stack structure of the ceramic green sheets 21 and 22. The raw laminate 25 has a stack structure including the plurality of ceramic layers 6 and plurality of internal electrodes 7 and 8 in the raw. In addition, in this preferred embodiment, the raw laminate 25 has the internal electrodes 7 and 8 exposed at a surface 4a of the raw laminate 25, which is parallel or substantially parallel to the LT surface 4 (see FIG. 5).

Figure 4:
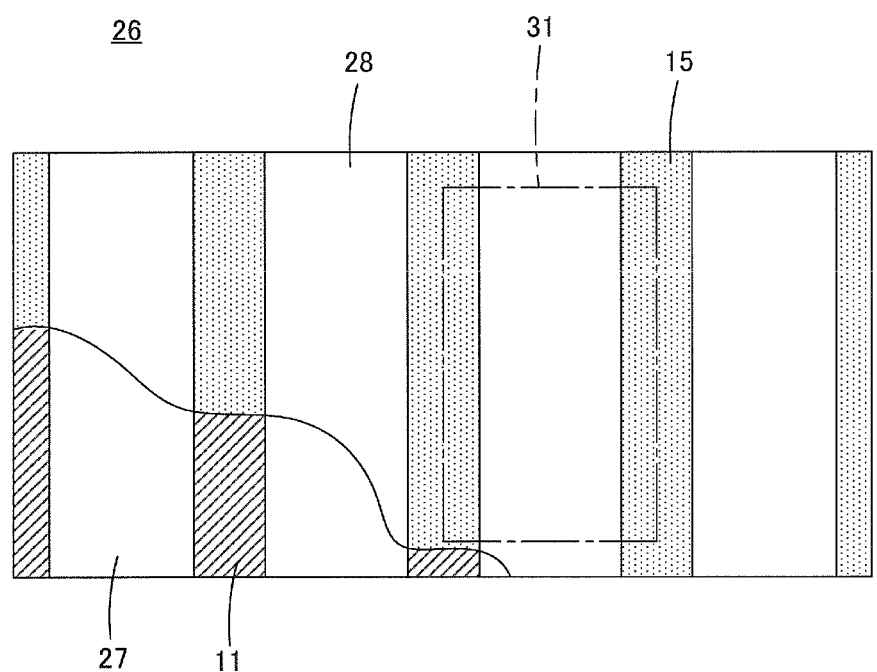
FIG. 4 is a plan view illustrating a mother sheet 26 for an outer layer, which is prepared in the process of manufacturing the laminated ceramic electronic component 1 in shown in FIG. 1, and partially illustrating the inside of the mother sheet 26.

On the other hand, a mother sheet 26 for an outer layer is prepared as shown in FIG. 4. It is to be noted that the mother sheet 26 for an outer layer is only partially shown in FIG. 4.

The prepared mother sheet 26 for an outer layer in the raw has a structure of a raw ceramic base layer 27 and a raw ceramic outer layer 28 stacked. The internal dummy electrode 11 is formed between the ceramic base layer 27 and the ceramic outer layer 28, and the external dummy electrodes 15 are formed on the ceramic outer layer 28. The ceramic base layer 27 and the internal dummy electrode 11 are shown in FIG. 4 in such a way that the ceramic outer layer 28 is partially fractured and removed. The internal dummy electrodes 11 and the external dummy electrodes 15 are both formed into relatively narrow strips by printing a conductive paste.

Next, the mother sheet 26 for an outer layer is cut into a predetermined size. More specifically, the mother sheet 26 for an outer layer is cut so as to provide such a length that defines a circuit along the surface 3a that is parallel or substantially parallel to the LW surface 3 and the surface 4a that is parallel or substantially parallel to the LT surface 4 in the raw laminate 25. This cutting extracts an outer layer sheet 31 corresponding to the region indicated by an alternate long and short dash line in FIG. 4. The outer layer sheet 31 forms, along both edges thereof, the internal dummy electrodes 11 and the external dummy electrodes 15. As can be seen from the size and location of the outer layer sheet 31 indicated by the alternate long and short dash line in FIG. 4, a plurality of outer layer sheets 31 can be extracted from the mother sheet 26 for an outer layer.

Next, the outer layer sheet 31 is attached onto the surfaces 3a and 4a in the raw laminate 25 that are respectively parallel or substantially parallel to the LW surface 3 and the LT surface 4. More specifically, as can be seen from FIG. 5, the outer layer sheet 31 is wrapped so as to define a circuit along the surfaces 3a and 4a in the raw laminate 25 that are respectively parallel or substantially parallel to the LW surface 3 and the LT surface 4. In this case, the ceramic base layer 27 of the outer layer sheet 31 is brought into contact with the raw laminate 25. In addition, the beginning and end of the outer layer sheet 31 are butted with each other so as to provide a smooth outer surface without steps. Thus, as described previously, the exposed end of the internal dummy electrode 11 can define a circuit continuously around the laminate 25.

It is to be noted that the position of the junction between the beginning and end of the outer layer sheet 31 is not limited to in the central region of the surface 3a that is parallel or substantially parallel to the LW surface 3 as shown in the figure, and may be shifted to other positions or onto the other surfaces.

In this way, the component main body 2 in the raw before firing is obtained in which the ceramic base layer 27 is formed on the surfaces 3a and 4a in the raw laminate 25 respectively parallel or substantially parallel to the LW surface and the LT surface 4, the internal dummy electrodes 11 are formed thereon with their exposed ends exposed at the WT surfaces 5, the raw ceramic outer layer 28 is also formed to cover the internal dummy electrodes 11, and further, the external dummy electrodes 15 are formed on the raw ceramic outer layer 28.

Next, the raw laminate 25 with the ceramic base layer 27, ceramic outer layer 28, internal dummy electrodes 11, and external dummy electrodes 15 formed as described above is subjected to firing. This firing provides the component main body 2 including the sintered laminate 25 and outer layer sheet 31, as shown in FIG. 5.

Next, the plating films 9 and 10 are formed at least on the WT surfaces 5 so as to electrically connect the respective exposed ends of the plurality of internal electrodes 7 to each other and the respective exposed ends of the plurality of internal electrodes 8 to each other. In this case, the plating films 9 and 10 are formed so as to grow with the use of the exposed ends of the internal electrodes 7 and 8, the exposed ends of the internal dummy electrodes 11, and the external dummy electrodes 15 as nuclei for plating deposition, reach at least the external dummy electrodes 15, and cover the external dummy electrodes 15.

It is to be noted that the WT surfaces 5 of the component main body 2 are preferably subjected to a polishing treatment before the plating step described above, in order to sufficiently expose the ends of the internal electrodes 7 and 8 and internal dummy electrodes 11 at the WT surfaces 5. In this case, when the polishing treatment is carried out to such an extent that the respective exposed ends of the internal electrodes 7 and 8 as well as internal dummy electrodes 11 protrude from the WT surfaces 5, the respective exposed ends will expand in the planar direction, and the energy required for plating growth can be thus reduced.

In the example of a manufacturing process described above, the laminated ceramic electronic component 1 shown in FIG. 1 is completed. This laminated ceramic electronic component 1 allows the exposed ends of the internal dummy electrodes 11 to define a circuit around the laminate 25 continuously as described above. Thus, when the plating films 9 and 10 are formed, the fixing strength of the plating films 9 and 10 is increased to make it possible to prevent the ingress of moisture with more certainty.

The plating films 9 and 10 described above preferably contain copper as their main constituent. The use of copper as their main constituent provides excellent plating growth, thus increasing the efficiency of the plating treatment, and allows the fixing strength of the plating films 9 and 10 to be increased. However, if these advantages are not desired, the plating films 9 and 10 may contain other metal such as nickel as their main constituent, for example.

In order to improve the solderability as external terminal electrodes, a plating film containing, for example, tin or gold as its main constituent may be formed on the plating films 9 and 10, and further, a plating film containing, for example, nickel as its main constituent may be formed as a base for the plating film for improving the solderability, in order to provide a solder barrier property.

The plating method for forming various plating films including the plating films 9 and 10 as described above may be an electroplating method through a current applying process, or an electroless plating method for depositing metal ions with the use of a reducing agent.

It is to be noted that the component main body 2 is preferably subjected to a heat treatment after the plating treatment described above. As the heat treatment temperature, a temperature of, for example, 600° C. or more, preferably 800° C. or more is used. This heat treatment produces interdiffusion between each of the internal electrodes 7 and 8, internal dummy electrodes 11 and external dummy electrodes 15 and the plating films 9 and 10, and this interdiffusion produces volume expansion of the metals. Thus, gaps which can be present among the ceramic layers 6, the internal electrodes 7 and 8, the internal dummy electrodes 11, the external dummy electrodes 15, as well as the plating films 9 and 10 can be filled advantageously, and as a result, the effect of preventing the ingress of moisture into the component main body 2 is further increased.

Figure 6:
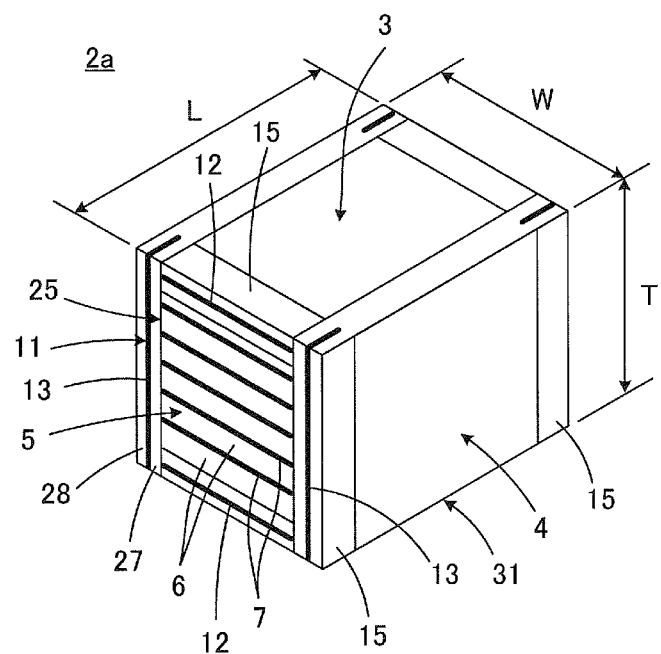
FIG. 6 is a perspective view illustrating the appearance of a component main body 2a included in a laminated ceramic electronic component according to a second preferred embodiment of the present invention.
Figure 7:
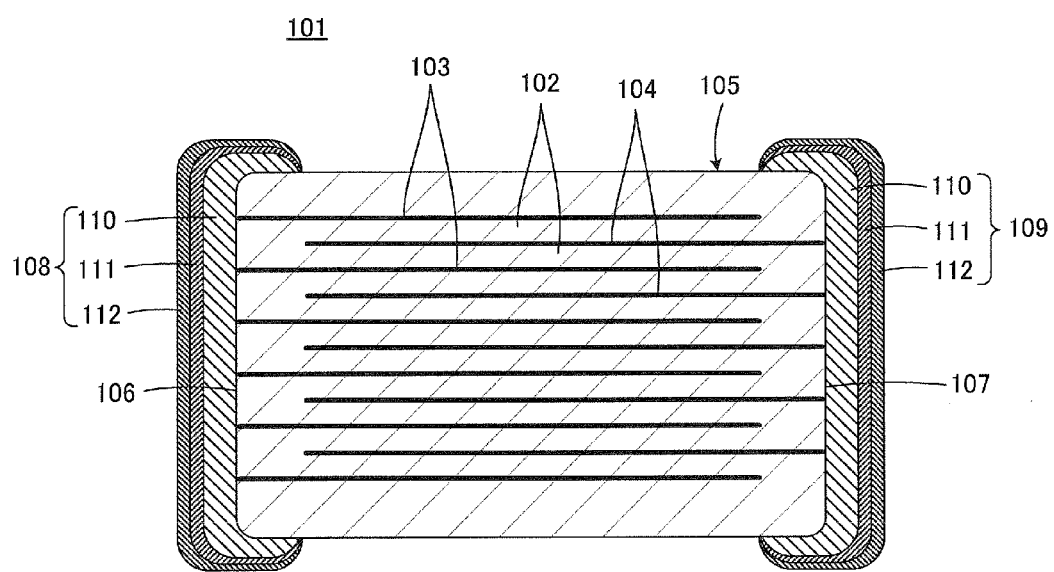
FIG. 7 is a cross-sectional view illustrating a conventional laminated ceramic electronic component 101.
Figure 8:
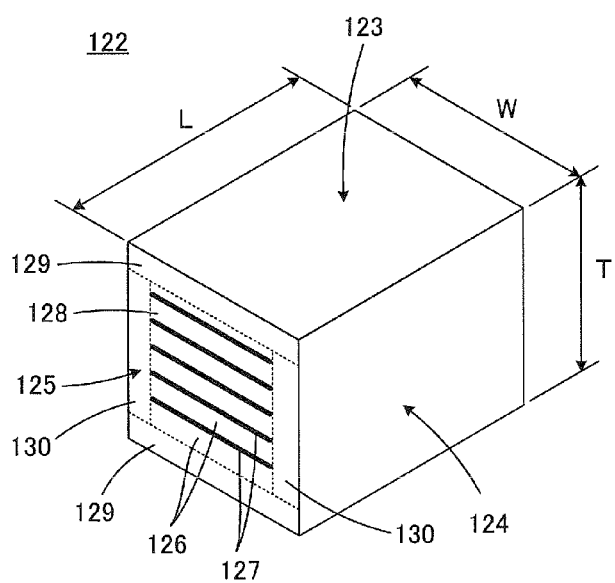
FIG. 8 is a perspective view illustrating the appearance of a component main body 122 of a laminated ceramic electronic component, for the explanation of problems of the prior art.

Next, a second preferred embodiment of the present invention will be described with reference to FIG. 6. FIG. 6 is a perspective view illustrating the appearance of a component main body 2a included in a laminated ceramic electronic component, which corresponds to FIG. 5. In FIG. 6, the elements corresponding to the elements shown in FIG. 5 are denoted by like reference numerals, and the repeated descriptions of the elements will be omitted.

The component main body 2a shown in FIG. 6 is obtained in the following way. First, a raw laminate 25 is prepared as shown in FIG. 3. In addition, four peripheral sheets 31 are cut out of the outer mother sheet 26 shown in FIG. 4. These peripheral sheets 31 are shorter in the vertical direction in FIG. 4 than the region indicated by the alternate long and short dash line.

Next, the peripheral sheet 31 is attached onto the surface 3a (see FIG. 3) in the raw laminate 25 that is parallel or substantially parallel to the LW surface 3 (see FIG. 6), and the outer layer sheet 31 is attached onto the surface 4a (see FIG. 3) in the raw laminate 25 that is parallel or substantially parallel to the LT surface 4 (see FIG. 6). In this way, the multiple outer layer sheets 31 are attached side by side.

Next, the raw laminate 25 with the outer layer sheets 31 attached thereon is subjected to firing. This firing provides a sintered component main body 2a. After that, as in the case of the first preferred embodiment described previously, the component main body 2a is subjected to a plating step to complete a laminated ceramic electronic component 1.

In the second preferred embodiment, the exposed ends of the internal dummy electrode 11 are arranged so as to define respective sides of a quadrangle, while the exposed ends of the internal dummy electrode 11 for defining the respective sides are independent of each other. Therefore, as a modification example of the second preferred embodiment, not shown, for example, a difference can be made in design between the outer layer sheet 31 on the surface 3a that is parallel or substantially parallel to the LW surface 3 and the outer layer sheet 31 on the surface 4a parallel to the LT surface 4, in such a way that a change is made to the number of internal dummy electrodes 11 stacked or to the area of the internal dummy electrodes 11 and/or the external dummy electrodes 15.

In addition, as a further modification example of the second preferred embodiment, the outer layer sheet 31 may have such dimensions that cover two surfaces of one surface 3a that is parallel or substantially parallel to the LW surface 3 and one surface 4a that is parallel or substantially parallel to the LT surface 4, for the use of two outer layer sheets 31. Furthermore, the outer layer sheet 31 can have a variety of cover dimensions.

In addition, while the outer layer sheet 31 including the ceramic base layer 27, the ceramic outer layer 28, the internal dummy electrodes 11, and the external dummy electrodes is used in the first and second preferred embodiments, the ceramic base layer 27, the ceramic outer layer 28, the internal dummy electrodes 11, and the external dummy electrodes 15 may be each formed by a coating method. Alternatively, after using and attaching an outer layer sheet composed of only the ceramic base layer 27, ceramic outer layer 28, and internal dummy electrodes 11, only the external dummy electrodes 15 may be formed by a coating method.

In addition, although not shown, when the internal electrodes 7 and 8 included in the laminate 25 are not exposed at the surface 4a that is parallel or substantially parallel to the LT surface 4, the ceramic base layer 27 can be omitted.

In addition, when it is satisfactory to form the plating films 9 and 10 as external terminal electrodes only on the WT surface 5, the external dummy electrodes 15 can be omitted.

When the laminated ceramic electronic component 1 constitutes a laminated ceramic capacitor, the ceramic layers 6 are preferably made of a dielectric ceramic. It is to be noted that the laminated ceramic electronic component 1 may constitute other inductor element, thermistor element, piezoelectric element, etc. Therefore, depending on the function of the laminated ceramic electronic component 1, the ceramic layers 6 may be made of, in addition to a dielectric ceramic, a magnetic ceramic, a semiconductor ceramic, a piezoelectric ceramic, etc.

It is to be noted that while the laminated ceramic electronic component 1 shown in the figure preferably is a two-terminal laminated ceramic electronic component including the two plating films 9 and 10 as external terminal electrodes, the present invention can also be applied to multi-terminal laminated ceramic electronic components such as, for example, three-terminal laminated ceramic electronic components.

Next, experimental examples will be described below which were carried out for confirming the advantageous effects of various preferred embodiments of the present invention.

Experimental Example 1

In Experimental Example 1, with the exception of no external dummy electrode 15 being provided, a laminated ceramic capacitor including the structure of the laminated ceramic electronic component 1 according to the first preferred embodiment described with reference to FIGS. 1 to 5 was prepared as sample 1 within the scope of the present invention. The details are as follows.

(1) Preparation of Component Main Body

First, details are as follows on the component main body of the laminated ceramic capacitor according to sample 1. The component main body was made to have a length dimension of 1.9 mm, a width dimension of 1.05 mm, and a thickness dimension 1.05 mm. The ceramic layers were composed of a barium titanate based dielectric ceramic, and the internal electrodes and internal dummy electrodes were each made to contain nickel as their main constituent. After sintering, the ceramic layers between adjacent internal electrodes had a thickness of 5 μm, the internal electrodes had a thickness of 1.5 μm, the ceramic base layer and ceramic outer layer of the outer layer sheet each had a thickness of 10 μm, and the internal dummy electrodes had a thickness of 1.5 μm.

On the other hand, as a component main body for a laminated ceramic capacitor according to sample 2 as a comparative example outside the scope of the present invention, a component main body with the same structure and dimensions as those of sample 1 was prepared with the exception of no internal dummy electrode 11 being provided.

(2) Plating Treatment

The copper strike bath shown in Table 1 below and the thick copper bath shown in Table 2 were prepared as plating baths.

TABLE 1

| <Copper Strike Bath> | | |
|---|---|---|
| Plating Bath | Copper Pyrophosphate | 15 g/l |
| | Potassium Pyrophosphate | 120 g/l |
| | Potassium Oxalate | 10 g/l |
| | PH | 8.7 |
| | Bath Temperature | 25° C. |

TABLE 2

| <Thick Copper Bath> | |
|---|---|
| Plating Bath | Pyro-Bright Process from C. Uyemura & Co., Ltd. |
| | pH 8.6 |
| | Bath Temperature 55° C. |

For each of samples 1 and 2, 500 samples of the component main body were put in a 290 ml horizontal rotation barrel, and in addition, 100 ml of a conductive medium of 1.3 mm in diameter was put therein.

Then, the horizontal rotation barrel was immersed in the copper strike plating bath shown in Table 1, and a current was applied at a current density of 0.15 A/dm$^2$ while rotating the barrel at a barrel peripheral speed of 2.6 m/min, thereby carrying out copper strike plating until reaching a film thickness of 1 μm.

Then, the same horizontal rotation barrel was immersed in the thick copper bath shown in Table 2, and a current was applied at a current density of 0.30 A/dm$^2$ while rotating the barrel at the same barrel peripheral speed, thereby carrying out thick copper plating until reaching a film thickness of 5 μm.

(3) Heat Treatment

The component main bodies according to each of samples 1 and 2 with the copper plating layers formed as described above were subjected to a heat treatment in a nitrogen atmosphere with an oxygen partial pressure of 5 ppm or less for a period of 30 minutes from an inlet to an outlet with the use of a tunnel furnace.

In this case, three levels of 600° C., 700° C., and 800° C. were employed as the top temperature of the heat treatment.
(4) Reliability Test The laminated ceramic capacitors thus obtained according to each of samples 1 and 2 were subjected to a moisture resistance reliability test (temperature: 85° C., relative humidity: 85%, applied voltage: 6.3 V). Then, the sample was regarded as a defective when the insulation resistance was decreased to 1 MΩ or less after a lapse of 150 hours, and the number of defectives was obtained among 72 samples. The results are shown in Table 3.

TABLE 3

| Sample Number | Heat Treatment 600° C. | Heat Treatment 700° C. | Heat Treatment 800° C. |
|---|---|---|---|
| 1 | 0/72 | 0/72 | 0/72 |
| 2 | 19/72 | 6/72 | 2/72 |

From Table 3, it is determined that sample 1 provides sufficiently high reliability.

Experimental Example 2

In Experimental Example 2, with the exception of no external dummy electrode 15 being provided, a laminated ceramic capacitor including the structure of the laminated ceramic electronic component 1 according to the second preferred embodiment described with reference to FIG. 6 was prepared as sample 3 within the scope of the present invention.

The details are as follows.
(1) Preparation of Component Main Body

A component main body was prepared to have the same dimensions with the use of the same materials as in the case of sample 1, except that the outer layer sheet was divided into four sheets, which were then attached onto the outer surface of a laminate.
(2) Plating Treatment The plating treatment was carried out under the same conditions as in the case of Experimental Example 1.
(3) Heat Treatment The heat treatment was carried out under the same conditions as in the case of Experimental Example 1. It is to be noted that for the top temperature of the heat treatment, a temperature of 630° C. was employed instead of 600° C. employed in Experimental Example 1.
(4) Reliability Test The moisture resistance reliability test was carried out under the same conditions as in the case of Experimental Example 1, and evaluations were made in the same way as in the case of Experimental Example 1. The results are shown in Table 4.

TABLE 4

| Sample Number | Heat Treatment 630° C. | Heat Treatment 700° C. | Heat Treatment 800° C. |
|---|---|---|---|
| 3 | 7/72 | 1/72 | 0/72 |

From Table 4, it is determined that sample 3 also provides sufficiently high reliability, although sample 3 is somewhat inferior to sample 1.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A laminated ceramic electronic component comprising:
a component main body having a rectangular parallelepiped shape or a substantially rectangular parallelepiped shape including an LW surface defined by a length dimension L and a width dimension W, an LT surface defined by the length dimension L and a thickness dimension T, and a WT surface defined by the width dimension W and the thickness dimension T, the component main body having a stack structure including a plurality of ceramic layers extending in the direction of the LW surface and stacked in the thickness direction and a plurality of internal electrodes arranged along interfaces between the ceramic layers and including exposed ends that are exposed at the WT surface; and
a plating film provided directly on at least the WT surface so as to electrically connect the respective exposed ends of the plurality of internal electrodes to each other; wherein
the component main body further includes an internal dummy electrode with an exposed end exposed around a region where the exposed ends of the plurality of internal electrodes are distributed in the WT surface, and the internal dummy electrode includes two LW-direction sections extending parallel or substantially parallel to each other in a direction along the LW surface, and two LT-direction sections extending parallel or substantially parallel to each other in a direction along the LT surface, and the plating film is disposed directly over at least the exposed end of the internal dummy electrode.

2. The laminated ceramic electronic component according to claim 1, wherein at least one of the LW-direction sections and at least one of the LT-direction sections of the internal dummy electrode are connected to each other.

3. The laminated ceramic electronic component according to claim 1, further comprising an external dummy electrode provided in a region in the LW surface and the LT surface that is adjacent to the WT surface, wherein the plating film is arranged to cover the WT surface and to cover at least the external dummy electrode.

4. A method for manufacturing a laminated ceramic electronic component, the method comprising the steps of:
preparing a component main body having a rectangular parallelepiped shape or a substantially rectangular parallelepiped shape including an LW surface defined by a length dimension L and a width dimension W, an LT surface defined by the length dimension L and a thickness dimension T, and a WT surface defined by the width dimension W and the thickness dimension T, the component main body having a stack structure including a plurality of ceramic layers extending in the direction of the LW surface and stacked in the thickness direction and a plurality of internal electrodes formed along interfaces between the ceramic layers and including exposed ends exposed at the WT surface; and
forming directly a plating film on at least the WT surface so as to electrically connect the respective exposed ends of the plurality of internal electrodes to each other; wherein
the step of preparing the component main body includes:

a step of preparing a raw laminate having a stack structure including the plurality of ceramic layers and the plurality of internal electrodes in the raw;

a step of forming an internal dummy electrode extending along surfaces of the raw laminate that are respectively parallel or substantially parallel to the LW surface and the LT surface, and the internal dummy electrode including an exposed end exposed at the WT surface, and forming a raw ceramic outer layer covering the internal dummy electrode; and a step of firing the raw laminate including the internal dummy electrode and the raw ceramic outer layer, and the step of forming directly the plating film includes a step of forming the plating film so as to reach at least the exposed end of the internal dummy electrode.

5. The method for manufacturing a laminated ceramic electronic component according to claim 4, wherein the step of forming the internal dummy electrode and the raw ceramic outer layer includes a step of preparing an outer layer sheet in advance including an integrated combination of the internal dummy electrode and the raw ceramic outer layer, and a step of attaching the outer layer sheet onto the surfaces of the raw laminate that are respectively parallel or substantially parallel to the LW surface and the LT surface.

6. The method for manufacturing a laminated ceramic electronic component according to claim 5, wherein the step of preparing the outer layer sheet includes a step of preparing multiple outer layer sheets, and the step of attaching the outer layer sheet includes a step of attaching the multiple outer layer sheets side by side onto the surfaces of the raw laminate that are respectively parallel or substantially parallel to the LW surface and the LT surface.

7. The method for manufacturing a laminated ceramic electronic component according to claim 5, wherein the step of preparing the outer layer sheet includes a step of preparing a length of an outer layer sheet, which forms a circuit along the surfaces of the raw laminate that are respectively parallel or substantially parallel to the LW surface and the LT surface, and the step of attaching the outer layer sheet includes a step of wrapping the outer layer sheet so as to form a circuit along the surfaces of the raw laminate that are respectively parallel or substantially parallel to the LW surface and the LT surface.

8. The method for manufacturing a laminated ceramic electronic component according to claim 5, wherein the outer layer sheet includes an external dummy electrode formed on the raw ceramic outer layer, the external dummy electrode being located in a region in the LW surface and the LT surface that is adjacent to the WT surface, and the step of forming the plating film includes a step of forming the plating film so as to cover at least the external dummy electrode.

9. The method for manufacturing a laminated ceramic electronic component according to claim 5, wherein the outer layer sheet has a stack structure further including a raw ceramic base layer integrally combined in advance in addition to the internal dummy electrode and the raw ceramic outer layer, the internal dummy electrode being sandwiched between the raw ceramic base layer and the raw ceramic outer layer.

10. The method for manufacturing a laminated ceramic electronic component according to claim 4, further comprising a step of forming an external dummy electrode on the raw ceramic outer layer so as to be located in a region in the LW surface and the LT surface that is adjacent to the WT surface, wherein the step of forming the plating film includes a step of forming the plating film so as to cover at least the external dummy electrode.

11. The method for manufacturing a laminated ceramic electronic component according to claim 4, further comprising a step of forming a raw ceramic base layer on the surfaces of the raw laminate that are respectively parallel or substantially parallel to the LW surface and the LT surface.

12. The method for manufacturing a laminated ceramic electronic component according to claim 9, wherein the raw laminate prepared in the step of preparing the raw laminate has the internal electrodes exposed at the surface of the raw laminate that is parallel or substantially parallel to the LT surface.

* * * * *